US009344390B1

(12) United States Patent
Chandrasekar et al.

(10) Patent No.: US 9,344,390 B1
(45) Date of Patent: May 17, 2016

(54) SYSTEMS AND METHODS FOR ELECTRONIC DOCUMENT REVIEW

(71) Applicant: First Advantage Litigation Consulting, St. Petersburg, FL (US)

(72) Inventors: Rajkumar Chandrasekar, Monrovia, CA (US); Peter Feinberg, Washington, DC (US)

(73) Assignee: Consilio, LLC, Washington, DC (US)

( * ) Notice: Subject to any disclaimer, the term of this patent is extended or adjusted under 35 U.S.C. 154(b) by 0 days.

(21) Appl. No.: 14/711,997

(22) Filed: May 14, 2015

Related U.S. Application Data

(63) Continuation of application No. 14/609,898, filed on Jan. 30, 2015.

(51) Int. Cl.
| G06F 15/16 | (2006.01) |
|---|---|
| H04L 12/58 | (2006.01) |
| G06F 17/27 | (2006.01) |
| G06F 17/30 | (2006.01) |

(52) U.S. Cl.
CPC ............ *H04L 51/12* (2013.01); *G06F 17/2705* (2013.01); *G06F 17/30598* (2013.01); *H04L 51/34* (2013.01); *G06F 17/3071* (2013.01); *G06F 17/30554* (2013.01); *G06F 17/30613* (2013.01); *H04L 51/16* (2013.01); *H04L 51/22* (2013.01); *H04L 51/32* (2013.01)

(58) Field of Classification Search
CPC ......... H04L 51/32; H04L 51/16; H04L 51/00; H04L 51/12; H04L 51/34; H04L 51/22; G06F 17/30029; G06F 17/30038; G06F 17/2705; G06F 17/30598; G06F 17/30613; G06F 17/30554; G06F 17/3071
USPC .......................... 709/204–206; 715/205, 835; 707/723–724, 741, 737
See application file for complete search history.

(56) References Cited

U.S. PATENT DOCUMENTS

| 7,730,113 | B1* | 6/2010 | Payette ................. G06Q 10/00 707/821 |
|---|---|---|---|
| 8,392,409 | B1* | 3/2013 | Kashyap .............. G06Q 10/107 707/723 |
| 2007/0179945 | A1* | 8/2007 | Marston .............. G06Q 10/107 |
| 2010/0030798 | A1* | 2/2010 | Kumar ............. G06F 17/30873 707/737 |
| 2011/0093471 | A1 | 4/2011 | Brockway et al. |
| 2011/0185025 | A1* | 7/2011 | Cherukuri ........... H04L 12/1813 709/206 |
| 2012/0239761 | A1* | 9/2012 | Linner ................ G06F 17/2765 709/206 |
| 2013/0218896 | A1* | 8/2013 | Palay ................ G06F 17/30312 707/741 |
| 2014/0047049 | A1* | 2/2014 | Poston ................ H04L 12/1822 709/206 |
| 2015/0244657 | A1* | 8/2015 | Ghafourifar .......... H04L 51/066 709/206 |

OTHER PUBLICATIONS

International Search Report and Written Opinion of the International Searching Authority for PCT/US15/41667, Oct. 23, 2015.

* cited by examiner

*Primary Examiner* — Jungwon Chang
(74) *Attorney, Agent, or Firm* — Jeffrey B. Fabian; Shumaker, Loop & Kendrick, LLP

(57) ABSTRACT

Systems and methods enable convenient and accurate searching, filtering, reviewing, and classification of electronic documents without the loss of metadata. A communication data source file is parsed into conversation-specific files that include message content and metadata. The message content and metadata are displayed on a computing device operated by a reviewer. To streamline the review process, the reviewer can filter display of the message content according to various metadata categories as well as search conversation-specific files using the metadata categories.

16 Claims, 17 Drawing Sheets

HELP DESK

| | | |
|---|---|---|
| 6:39:35 | CHAT USER : | how do we read the price index? the p |
| 6:39:37 | HELP DESK : | Thank you for using the Help Desk |
| 6:41:26 | HELP DESK : | HI there |
| 6:41:30 | HELP DESK : | Do you have the ticker for that? |
| 6:42:11 | CHAT USER : | URLTCOFH |
| 6:42:27 | CHAT USER : | with a Index behind^^" |
| 6:45:22 | HELP DESK : | Please allow me a few minutes to loo |
| 6:47:51 | CHAT USER : | ok |
| 7:07:03 | HELP DESK : | Thanks again for waiting, still looking |
| 7:13:47 | HELP DESK : | Please note that URLTCOFH INDEX < |
| 7:13:57 | HELP DESK : | Is there anything else we may assist y |
| 7:14:23 | CHAT USER : | how do we use the price index to calc |
| 7:17:06 | HELP DESK : | You cannot use these to calculate pro |
| 7:17:45 | CHAT USER : | how does it show the trend using the |

FIG. 2

```xml
<?xml version="1.0" encoding="UTF-8" standalone="no"?>
<FileDump>

<Version>IBXML 1.3</Version>
  <Conversation Perspective=" " RoomType="P">
    <RoomID>PCHAT-Ox3000001ABC123</RoomID>
    <StartTime>06/16/2014 21:01:25</StartTime>
    <StartTimeUTC>1371416485</StartTimeUTC>
    <ParticipantEntered InteractionType="N" DeviceType="M">
      <User>

<LoginName>TEST1</LoginName>
        <FirstName>TEST</FirstName>
        <LastName>SUBJECT</LastName>
        <UUID>123456</UUID>
        <FirmNumber>0001</FirmNumber>
        <AccountNumber>100200</AccountNumber>
        <CompanyName>TEST CAPITAL INC.</CompanyName>
        <EmailAddress>TSUBJECT1@chat.net</EmailAddress>
        <CorporateEmailAddress>test.subject@TESTcapital.com
          </CorporateEmailAddress>

</User>

<DateTime>06/16/2014 21:01:25</DateTime>
      <DateTimeUTC>1371416485</DateTimeUTC>
      <ConversationID>PCHAT-Ox3000001ABC123</ConversationID>

</ParticipantEntered>

<ParticipantLeft InteractionType="NH" DeviceType="M">
      <User>

<LoginName>TEST1</LoginName>
        <FirstName>TEST</FirstName>
        <LastName>SUBJECT</LastName>
        <UUID>123456</UUID>
        <FirmNumber>0001</FirmNumber>
        <AccountNumber>100200</AccountNumber>
        <CompanyName>TEST CAPITAL INC.</CompanyName>
        <EmailAddress>TSUBJECT1@chat.net</EmailAddress
        <CorporateEmailAddress>test subject@TESTcapital.com
          </CorporateEmailAddress>

</User>
      <DateTime>06/17/2013 10:51:20</DateTime>
      <DateTimeUTC>1371466280</DateTimeUTC>

<ConversationID>PCHAT-Ox3000001ABC123</ConversationID>
    </ParticipantLeft>
```

FIG. 3

```
<ConversationID>PCHAT-Ox1000001ABC123</ConversationID>
</Message>
<Message InteractioInType="NH">
  <User>
    <LoginName>TEST1</LoginName>
    <FirstName>TEST</FirstName>
    <LastName>SUBJECT</LastName>
    <CompanyName>TEST_CAPITAL, INC.;</CompanyName>
    <EmailAddress>TSUBJECT1@chat.net</EmailAddress>
    <CorporateEmailAddress></CorporateEmailAddress>
  </User>
  <DateTime>06/17/2014 12:58:09</DateTime>
  <DateTimeUTC>1371473889</DateTimeUTC>

<Content>
```
If you keep 6s unchanged today, I can offer a crude oil call spread at $35.
```
  </Content>

<ConversationID>PCHAT-Ox1000001ABC123</ConversationID>
</Message>
<Message InteractionType="NH">
  <User>
    <LoginName>TPARTY</LoginName>
    <FirstName>THIRD</FirstName>
    <LastName>PARTY</LastName>
    <CompanyName>TEST ENTERPRISES INC;</CompanyName>
    <EmailAddress>TPARTYlchat.net</EmailAddress>
    <CorporateEmailAddress>third.party@testenterprises.com
    </CorporateEmailAddress>
  </User>
  <DateTime>06/17/2014 12:58:14</DateTime>
  <DateTimeUTC>1371473894</DateTimeUTC>

<Content>
```
I'm at 200 for $25.
```
  </Content>

<ConversationID>PCHAT-Ox1000001ABC123</ConversationID>
</Message>
<Message InteractionType="NH">
  <User>
    <LoginName>TEST1</LoginName>
    <FirstName>TEST</FirstName>
    <LastName>SUBJECT</LastName>
    <UUID>123456</UUID>
    <FirmNumber>0001</FirmNumber>
    <AccountNumber>100200</AccountNumber>
    <CompanyName>TEST_CAPITAL, INC.</CompanyName>
    <EmailAddress>TSUBJECT@chat.net</EmailAddress>
    <CorporateEmailAddress>test.subject@test.capital.com
</CorporateEmailAddress>
  </User>
  <DateTime>06/17/2014 12:58:58</DateTime>
  <DateTimeUTC>1371473938</DateTimeUTC>

<content>
```
Sold. I owe you big time. Come over one day after work and I'm opening a bottle of Bollinger.
```
  </Content>
```

FIG. 4

```xml
<ParticipantEntered InteractionType="NH">
    <User>
        <LoginName>THIRDPARTY</LoginName>
        <FirstName>THIRD</FirstName>
        <LastName>PARTY</LastName>
        <UUID>456789</UUID>
        <FirmNumber>0002</FirmNumber>
        <AccountNumber>300400</AccountNumber>
        <CompanyName>TEST ENTERPRISES INC.</CompanyName>
        <EmailAddress>TPARTY@chat.net</EmailAddress>
        <CorporateEmailAddress>third.party@testenterprises.com
            </CorporateEmailAddress>
    </User>
    <DateTime>06/17/2014 11:04:14</DateTime>
    <DateTimeUTC>1371467054</DateTimeUTC>
    <ConversationID>PCHAT-Ox3000001DFFA7E</ConversationID>
</ParticipantEntered>

<Message InteractionType="NH">
    <User>
        <LoginName>THIRDPARTY</LoginName>
        <FirstName>THIRD</FirstName>
        <LastName>PARTY</LastName>
        <UUID>456789</UUID>
        <FirmNumber>0002</FirmNumber>
        <AccountNumber>300400</AccountNumber>
        <CompanyName>TEST CAPITAL INC</CompanyName>
        <EmailAddress>TPARTY@chat.net</EmailAddress>
        <CorporateEmailAddress>third.party@testenterprises.com
</CorporateEmailAddress>
    </User>
    <DateTime>06/17/2014 11:04:14</DateTime>
    <DateTimeUTC>1371467054</DateTimeUTC>
    <Content>

*** THIRD PARTY Disclaimer: This electronic message contains information from TEST ENTERPRISES, INC., and may be confidential. The information is intended to be for the use of the message recipient. If you are not the intended recipient, be aware that any disclosure, copying, distribution or use of the contents of this message is prohibited. If you have received this electronic message in error, please notify the sender immediately by reply e-mail or telephone.

</Content>

<ConversationID>PCHAT-Ox3000001ABC123</ConversationID>
</Message>
```

FIG. 5

| MetadataField | Available in PST archives as structured data? |
|---|---|
| ChatAttachmentCount | Yes |
| ChatAttachmentLogin | No |
| ChatAttachmentName | Yes |
| ChatCompany | No |
| ChatCompanyCount | No |
| ChatDomainCount | Yes |
| ChatDomainNames | Yes |
| ChatDuration | No |
| ChatEndUTC | No |
| ChatFirmCount | No |
| ChatFirmNumber | No |
| ChatMessageCount | No |
| ChatParticipantCount | Yes |
| ChatParticipantEmail | Yes |
| ChatParticipantLogins | Yes |
| ChatParticipantNames | Yes |
| ChatRoomDuration | No |
| CharRoomEnd | No |
| ChatRoomID | Yes |
| ChatRoomPerspective | No |
| ChatRoomStart | Yes |
| ChatRoomType | No |
| ChatStartUTC | No |

FIG. 6 regarding market commentary from SharedSite Sales and/or Trading, who are active market participants; and in respect of SharedSite Research, including disclosures relating to specific issuers, please see http://publicresearch.sharedsite.com.
ASSOCIATED ANALYST/FIRST BANK (AANALYST)  06/17/2013 11:10:43 viewed the conversation from 06/17/2013 05:20:02 to 06/17/2013 11:10:35

JOHN DOE/DOE SECURITIES (JDOE)  06/17/2013 11:41:113
left the conversation

RON SMITH/PRACTICE LITIGATION SUPPORT (RSMITH)  06/17/2013 11:44:023

JANE SMITH/HEDGE FINANCIAL MANAGEMENT CO. (JSMITH)  06/17/2013 11:46:29
***SHARED SITE (231944 Disclaimer: This message is for information purposes only; it is not a recommendation, advice, offer or solicitation to buy or sell a product or service nor an official confirmation of any transaction. It is directed at persons who are professionals and is not intended for retail customer use. Intended for recipient only. This message is subject to the terms at www.sharedsite.com/salesandtradingdisclaimer. For important disclosures, please see: www.sharedsite.com/emaildisclaimer regarding market commentary from SharedSite Sales and/or Trading, who are active market participants; and in respect of SharedSite Research, including disclosures relating to specific issuers, please see http://publicresearch.sharedsite.com.

JANE SMITH/HEDGE FINANCIAL MANAGEMENT CO. (JSMITH)  06/17/2013 11:46:313
viewed the conversation from 06/17/2013 05:20:02 to 06/17/2013 11:46:29

RON SMITH/PRACTICE LITIGATION SUPPORT (RSMITH)  06/17/2013 11:56:07

M_Demo Group

Change Project   Edit Profile   Logout

| Manage | Reports | Notifications | Info |

Flash Viewer | Open Analytics

Search: [Chat_Docs]

00000c648
:20 GMT
:30 GMT

| Company | Post Count |
|---|---|
| SNL LIMITED | 11 |
| PRACTICE LITIGATION SUPPORT | 8 |
| SECURITIES TRADING CO. | 3 |
| CONSILIO ELECTRONIC DISCOVERY | 3 |
| STATE BANK | 11 |
| FUTURES TRADING CORP. | 0 |
| | 0 |

6/17/2013 06:04:13

6/17/2013 06:10:18
JSD uncertainty over
upport now up and

9/17/2013 06:26:04

6/07/2013 06:27:40
e then general

6/07/2013 06:32:00
↺ Reset  ⊗ Apply  e we have been then wed/thurs I prefer to be long with a stop below the recent lows looking to act first To FIG. 9A                312

SYSTEMS AND METHODS FOR ELECTRONIC DOCUMENT REVIEW

CROSS-REFERENCE TO RELATED APPLICATION

This Application is a continuation application of U.S. patent application Ser. No. 14/609,898 filed on Jan. 30, 2015, (now pending), the contents of which are incorporated by reference herein in their entirety.

TECHNICAL FIELD AND BACKGROUND

The present invention relates generally to the field of electronic document discovery, and more particularly, to systems and methods for processing and reviewing electronic documents.

Electronic discovery is becoming an increasingly important—and expensive—component of legal proceedings and regulatory and internal compliance investigations. Before providing electronic documents for potential use as evidence in a legal proceeding or regulatory or internal compliance investigation, the documents must be reviewed and classified according to relevance, confidentiality, and the like.

The manner in which electronic documents are processed and presented to attorneys and corporate compliance officers for review has a direct impact on the efficiency, accuracy, and cost-effectiveness of the review. Electronic documents should be displayed to users in a manner that is consistent, intuitive, and easy to read, and the electronic documents should be dynamically searchable and sortable. This can be particularly challenging when processing large volumes of electronic documents of varying file types, as is frequently the case in electronic discovery.

With respect to electronic communication documents, such as "chat" message transcripts, traditional methods of electronic discovery present such communications to reviewers in an email format as email formats are generally standardized formats, supportable by electronic discovery processing and review software solutions and recognizable to reviewers. However, presentation of electronic communication documents in email format has the disadvantages that lengthy chat transcript documents are cumbersome to review, and converting chat transcript documents to an email format for the purpose of electronic discovery review results in the loss of valuable metadata.

Instant chat messaging is becoming an increasingly popular means of collaboration across corporate entities worldwide. In particular industries such as securities trading, instant messaging software allows traders from one institution to concurrently engage in discussions with many other traders at the same or different institutions, in a single session (i.e., a "chat room"). At present, millions of instant messages are exchanged each day between millions of users. These messages are electronically archived and frequently sought during legal proceedings, regulatory investigations, or audits. It would, therefore, be advantageous to provide systems and methods that allow users to quickly and conveniently search, filter, review, and classify messages during electronic discovery without converting the messages to a format involving the loss of information.

SUMMARY

Accordingly, it is an object of the present invention to provide systems and methods that allow for the parsing of archived electronic communication source files into separate conversation-specific files that can be quickly, conveniently, and accurately searched, filtered, reviewed, and classified by reviewers. It is a further object of the present invention to provide systems and methods that permit conversation-specific files to be searched, filtered, and reviewed without the loss of metadata.

According to one embodiment of the invention, a method and system for reviewing electronic documents is provided. The system includes a computing device associated with a reviewer and a computing device associated with an electronic discovery system. The discovery system computing device parses an electronic communication data source file into one or more conversation-specific files. The conversation-specific files include message content and one or more metadata categories. The message content and metadata are transmitted to the reviewer computing device for review and analysis by a reviewer. The reviewer can utilize a software application to filter the message content according to the content categories, and the filtered message content is displayed to the reviewer dynamically. Content categories that can be used to filter the message content include a participant identifier and a participant-entity identifier, among others.

In another aspect of the invention, the conversation-specific file includes a first metadata category that is a participant-entered event and a second metadata category that is a participant-left event. The system filters the message content according to the participant-entered and participant-left events, and the filtered content is dynamically transmitted to the reviewer computing device for display. Another aspect of the invention includes the additional steps of filtering disclaimer text from the message content and transmitting the filtered message content without the disclaimer text to the reviewer computing device for display.

A further aspect of the invention can include the steps of searching the one or more conversation-specific files according to a metadata category and a metadata category value. The conversation-specific files that include the metadata category and the metadata category value are transmitted to the reviewer computing device for display and review. The conversation-specific files can be searched according to a variety of metadata categories, including session duration, participant count, a participant identifier, and an entity identifier, among others.

In yet another aspect of the invention, the reviewer computing device receives a conversation-specific file transmitted by the discovery system computing device. The conversation-specific file contains message content and at least one metadata category. The reviewer computing device transmits a filter request to the discovery computing device requesting that the message content be filtered according to a metadata category. The reviewer computing device subsequently receives filtered message content transmitted by the discovery computing device.

According to another embodiment of the invention, the discovery computing device parses an electronic communication data source file into one or more conversation-specific files. The conversation-specific files include message content and one or more metadata categories. The message contents and metadata categories are displayed by the discovery computing device, and the discovery computing device is used to filter the message content according to a metadata category. The filtered message content is displayed to the reviewer.

BRIEF DESCRIPTION OF THE DRAWINGS

Features, aspects, and advantages of the present invention are better understood when the following detailed description of the invention is read with reference to the accompanying figures, in which:

FIG. 2 is an exemplary communication session involving the exchange of instant chat messages;

FIG. 3 illustrates communication data, in extended markup language format, that is generated when a participant initiates and then terminates a communication session;

FIG. 4 illustrates communication data, in extended markup language format, that is generated when participants exchange messages;

FIG. 5 illustrates communication data, in extended markup language format, that is generated when disclaimer text is transmitted during a communication session;

FIG. 6 is a comparison of communication metadata categories supported by extended markup language and personal storage table file formats;

FIG. 7 illustrates communication data displayed in an email format;

FIGS. 9A-9B illustrates an exemplary display screen for filtering communication data;

Figure 10A:
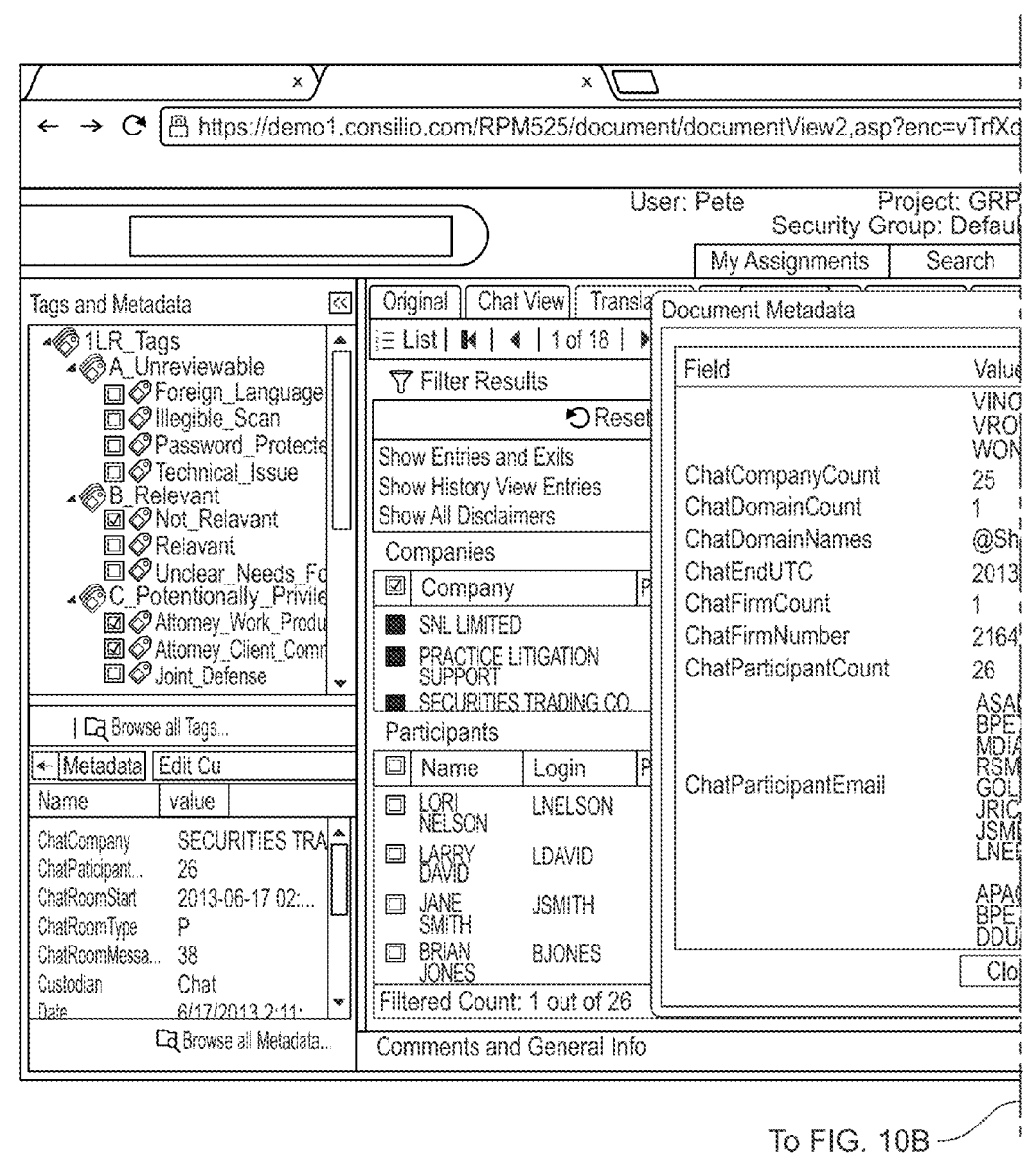

FIG. 10A-10B illustrates an exemplary display screen for displaying communication metadata;

DETAILED DESCRIPTION

Figure 1:
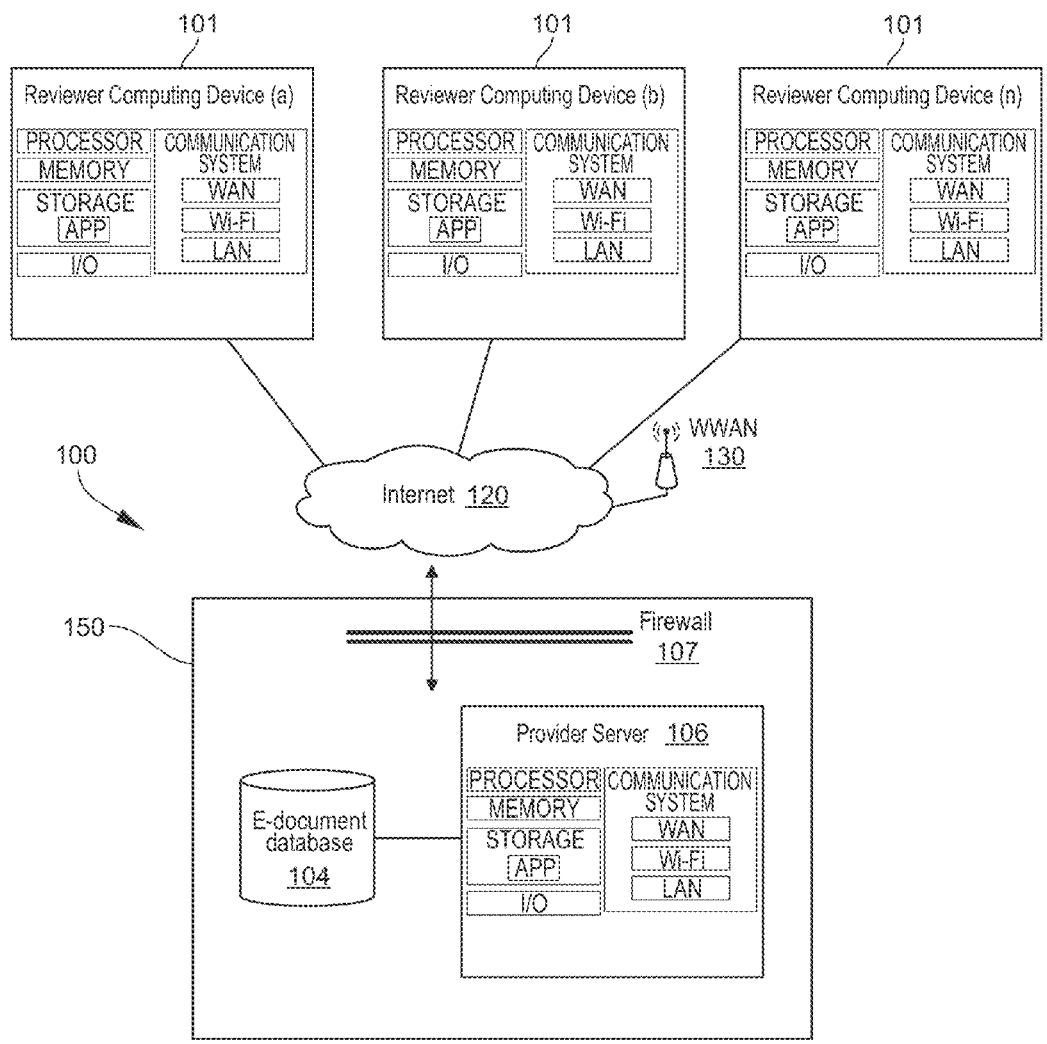
FIG. 1 is a schematic diagram of an exemplary hardware configuration according to one embodiment of the invention.

The present invention will now be described more fully with reference to the accompanying figures in which exemplary embodiments of the invention are shown. However, the invention may be embodied in many different forms and should not be construed as limited to the representative embodiments described below. The exemplary embodiments are provided so that this disclosure will be both thorough and complete and will fully convey the scope of the invention and enable one of ordinary skill in the art to make, use, and practice the invention.

Electronic discovery generally refers to any process in which electronic data is sought, located, gathered, reviewed, and produced with the intent of using it as evidence in a legal proceeding, audit, or investigation. The term "reviewer" is intended to describe an individual who utilizes the systems and methods of the present invention to review electronic documents as part of the electronic discovery process. The term reviewer may be used interchangeably with the terms "user" or "party." The term "provider" generally denotes an individual or entity that provides services related to electronic discovery.

The term "communication session" refers to an interactive information interchange between two or more communicating electronic devices and includes, for example, the exchange of email communications, the transmission of instant chat messages, or the posting of messages on a message board or social media platform. The term "communication session" is used interchangeably with the terms "conversation," "exchange," "chat room," or "chat-transcript record." The term "participant" generally describes an individual or entity that is actively or passively involved in a communication session. Electronically stored information relating to one or more communication sessions is generally referenced using the terms "archive file," "source file," "electronic communication data," "conversation-specific file," or "electronic discovery data," among other terms.

Disclosed are systems and methods that allow reviewers to efficiently and accurately review electronic communication data as part of the electronic discovery process without the loss of valuable information contained in the archived communication data During the normal course of business, individuals frequently utilize electronic communication platforms, such instant messaging, to exchange information in nearly real time. The substance of these communications is archived electronically along with metadata relating to the context of the communications. The metadata can include, for instance, the date and time each communication was sent and identifying information for the participants to a communication, like participant account numbers, the names of associated business entities, and other unique identifiers for the participant. The described systems and methods find particular application with respect to the review of instant chat message transcripts, but those of ordinary skill in the art will recognize that the systems and methods can be applied to the review of other types of electronic documents and communication data.

During electronic discovery, the archived communication data is gathered and processed into a database for review and analysis using electronic discovery software. The processing step generally takes the gathered archived communication data and unpacks individual electronic communication documents and extracts text to facilitate the creation of a searchable index and the storage of valuable metadata that further enables document searching. The database and electronic discovery software can be integrated with a computer system maintained by an electronic discovery provider. Parties to a legal proceeding or investigation or their agents access the electronic discovery software remotely for purposes of conducting a review. Alternatively, the database and electronic discovery software can be implemented on a computer system maintained by a party or a party's agent.

The electronic communication data can be reviewed in an email format resembling a continuous thread of message posts that include the content of each message, a screen name or other identifying information for the participant that originated a message, and a date and time that each message was posted. A chat-transcript record can, and often does, include thousands of messages from hundreds or thousands of participants. The resulting electronic documents can be enormous, multipage transcripts that are difficult to review. Gathering the electronic communication data from the native system archive in an email format can, and often does, also result in the loss of valuable metadata that is germane to the legal proceeding and that can be used to streamline the review process. This is because the email format lacks field definitions necessary to store valuable metadata that is in the native archive system, such as "message interaction type" or "UUID" or the participant's "account number." Thus, gathering, processing, and reviewing chat transcripts in email format can cripple the electronic discovery experience.

In addition, chat-transcript records often include numerous messages that constitute irrelevant "noise." Noise includes, for example, message posts that indicate the occurrence of a certain event (e.g., a participant entering or leaving a communication session), automated message posts such as disclaimer text (e.g., low-value, repetitive text content that is entered into the chat-transcript record by the chat messaging system and typically warns against forward looking statements), and substantive messages posts that are not germane to a legal proceeding or investigation. In some cases, over ninety percent of the chat-transcript record content constitutes noise. The result is that reviewers may have a difficult time sifting through communication data to identify and analyze relevant information. This leads to reviewer fatigue that significantly impacts the efficiency and accuracy of a review.

The systems and methods of the present invention overcome these disadvantages by presenting electronic communication data to reviewers in a format that facilitates convenient, efficient, and reliable review without the loss of metadata. The systems parse archived communication data, gathered in a full structured form and complete with all valuable metadata, into separate conversation-specific files for each chat-transcript record. The conversation-specific files are presented to reviewers and can be dynamically searched and filtered according to a wide range of criteria, such as the identity of the communication participants, the communication session duration, or the number of participants. In this manner, reviewers can focus on the chat-transcript records, participants, or other information that is the most relevant to the legal proceeding or investigation necessitating the electronic discovery review.

The systems and methods also allow reviewers to streamline the review processes by utilizing metadata to appropriately structure workflow during a review. To illustrate, discovery reviews are often performed by reviewers on an hourly cost basis. Conversation-specific files can be categorized according to the number of participants in a session or by session duration. Conversation-specific files containing the most data (i.e., the most participants or longest durations) can be assigned to reviewers with the lowest hourly rates.

Turning to the exemplary embodiment shown in FIG. 1, a system according to one embodiment of the present invention generally includes at least one computing device 101 associated with a reviewer and a computer system 150 associated with an electronic discovery provider. The electronic discovery provider computer system 150 may include a provider server 106, an electronic document database 104, a firewall 107, and one or more computing devices operated by provider associates (not shown).

The system shown in FIG. 1 is not intended to be limiting, and one of ordinary skill in the art will recognize that the systems and methods of the present invention may be implemented using other suitable hardware or software configurations. For example, the electronic discovery provider computer system 150 may utilize only a single server implemented by one or more computing devices or a single computing device may implement one or more of the provider server 106, electronic document database 104, firewall 107, and/or reviewer computing devices 101. Further, a single computing device may implement more than one step of the methods described herein; a single step may be implemented by more than one computing device; or any other logical division of steps may be used. In one embodiment, the system is maintained by a party to a legal proceeding or investigation that employs one or more associates or agents to conduct an electronic discovery review. With this embodiment, a single computing device can implement both the provider server 106 and the reviewer computing devices 101.

Any suitable computing device can be used to implement the reviewer computing devices 101 or the components of the electronic discovery provider computer system 150. The reviewer computing devices 101, the provider server 106, and the associate computing devices may include a processor that communicates with a number of peripheral subsystems via a bus subsystem. These peripheral subsystems may include a storage subsystem, user-interface input devices, user-interface output devices, a communication system, and a network interface subsystem. By processing instructions stored on one or more storage devices, the processors may perform the steps of the present method. Any type of storage device may be used, including an optical storage device, a magnetic storage device, or a solid-state storage device.

Typically, the reviewer computing devices 101 access the electronic discovery provider computer system 150 or communicate with each other over the Internet 120 in the normal manner—e.g., through one or more remote connections, such as a Local Area Network ("LAN") or Wireless Wide Area Network ("WWAN") 130 based on 802.11 standards or a data connection provided through a cellular service provider. These remote connections are merely representative of a multitude of connections that can be made to the Internet 120 for accessing the electronic discovery provider computer system 150 or communicating with other reviewer computing devices 101.

The provider server 106 and reviewer computing devices 101 include one or more integrated software applications that provide a graphical user interface, permit communication with other electronic devices, and generally implement the steps of the methods disclosed herein. Exemplary user-interface display screens are depicted in FIGS. 7-12. The user-interface screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

Electronic discovery data is gathered and loaded into the electronic document database 104. The electronic discovery data can be loaded into the database 104 in extensible markup language ("XML") format, personal storage table ("PST") format, MIME RFC 822 ("EML") format, or any other suitable format known to one of ordinary skill in the art. The discovery data is accessed by a discovery software application integrated with the discovery service provider server 106. The discovery software application formats the electronic discovery data for display on the reviewer computing devices 101, and the discovery data is transmitted to the reviewer computing device 101 for review and analysis.

Exemplary instant messaging communications as displayed to a chat participant are depicted in FIG. 2, and the embodiments shown in FIGS. 3-6 illustrate instant message communication data in XML format using multilevel, nested data structures made up of markup constructs. The markup constructs begin with a start tag consisting of an attribute enclosed by an open angle bracket ("<") and a closed angle bracket (">"). The markup construct terminates with an end tag consisting of an attribute enclosed within an open angle bracket followed by a forward slash ("</") and a closed angle bracket (">"). The attributes correspond to the labels of the metadata categories for the instant messages. The substance of the metadata as well as the message contents are book-ended by the start and end tags.

The structure of instant communication messages in XML format can be better understood with reference to the example shown in FIG. 3, which illustrates the data generated when a participant initiates and then terminates a communication session (i.e., enters and leaves a chat room). Each chat-transcript record is labeled with a unique conversation identification number. The conversation identification number is displayed as the PCHAT data field in FIG. 3 and is enclosed within the RoomID and ConversationID start and end tags.

When a communication session is initiated or terminated, the instant messaging software captures a variety of information that is stored as metadata, including, for example: (1) the date and time the session was initiated or terminated in both local time and universal coordinated time ("UTC"); (2) an event label indicating that a participant has entered or exited the chat room (i.e., the "ParticipantEntered" and "ParticipantLeft" attributes); and (3) identifying information, such as the participant's screen name, first name, last name, unique user identification number ("UUID"), firm number (i.e. an identification number for the corporate entity associated with a participant), account number, company name, instant messaging account email address, and a corporate email address. The participant information is contained within the parent User tag and the corresponding child subtags: LoginName (i.e., a shorthand screen name for participants), FirstName, UUID, etc. When the communication session is terminated, the termination event is recorded within the "ParticipantLeft" tags along with the participant identifying information so that the termination event can be linked to a particular participant.

An exemplary instant message conversation between two participants in XML format is displayed in FIG. 4. The content of the messages are enclosed within the parent "Message" tags and "Content" subtags. The message contents are recorded along with the date and time of each message and the identification information for the participant that originated the message. In some cases, communication software will automatically generate and display certain information upon the initiation of a communication session or transmission of a message. For instance, FIG. 5 illustrates the automatic generation and display of a confidentiality disclaimer. Such disclaimers are commonly appended to the outgoing external communications of many professional service providers and business enterprises. The disclaimer is recorded within the Message and Content tags of the XML file.

In addition to the categories described above, the disclosed systems and methods can process a wide variety of metadata categories describing the substance and context of a communication. Exemplary metadata categories are listed in FIG. 6 and include: (1) ChatAttachmentCount; (2) ChatAttachmentLogin; (3) ChatAttachmentName; (4) ChatCompany; (5) ChatCompanyCount; (6) ChatDomainCount; (7) ChatDomainNames; (8) ChatDuration; (9) ChatEndUTC; (10) ChatFirmCount; (11) ChatFirmNumber; (12) ChatMessageCount; (13) ChatParticipantCount; (14) ChatParticipantEmail; (15) ChatParticipantLogins; (16) ChatParticipantNames; (17) ChatRoomDuration; (18) ChatRoomEnd; (19) ChatRoomID; (20) ChatRoomPerspective; (21) ChatRoomStart; (22) ChatRoomType; (23) ChartStartUTC; and (24) any other useful metadata category captured by the communication software. Those of ordinary skill in the art will appreciate that these categories are not intended to be limiting, and the systems and methods can be configured to process additional information concerning the content and context of a chat-transcript record.

Multiple chat-transcript records are typically archived in a single electronic communication source file gathered from the native messaging system. Source files in structured, non-email format are gathered and parsed into separate XML files for each chat-transcript record to create conversation-specific XML files. In one embodiment, the structured, nonemail archived electronic communication source file is parsed by extracting all data structures corresponding to a particular PCHAT identification value and storing the data structures in a separate conversation-specific XML file. Storage of the data structures in a separate XML file enables dynamic searching and filtering by the electronic discovery review software according to a wide-range of criteria. The metadata elements for each conversation-specific file are stored to independent database fields in a relational database to enable searching within the electronic discovery review software.

The embodiment shown in FIG. 7 illustrates electronic discovery data displayed in an email format. For display in email format, an archived electronic communication source file can be gathered and segregated into separate, conversation-specific PST files for each chat-transcript record. The conversation-specific files are displayed on the reviewer computing device 101 in email format. In addition to the message contents, PST files also include metadata (however, less metadata than is gathered when the source file is structured, non-Email format) that further describes the context of communications transmitted or posted during a particular session. To illustrate, the conversation-specific PST file displayed in FIG. 7 shows each communication participant's name, associated business entity, and screen name along with a date and time that each message was posted. The conversation-specific PST file also includes metadata relating to certain events, such as when a participant initiates, terminates, or views a communication session as well as information concerning the communication session in general, such as the communication session start and end times and the number of participants in a session.

The PST file format supports significantly fewer metadata categories than the XML file format. A comparison of the metadata categories supported by the PST and XML file formats is shown in FIG. 6. In addition, PST files are "flat" in that the message content is stored as featureless text in the email body without any distinguishing tags, keys, or field structures. Thus, the message contents and associated metadata cannot be dynamically searched and filtered as with XML files. The display, searching, and filtering of communication data contained within XML files are illustrated in FIGS. 8-12. Skilled artisans will appreciate that the exemplary embodiments shown in the attached figures are not intended to be limiting, and the inventive systems and methods can process electronic documents stored in any structured data format and created using a variety of communication software platforms, including, but not limited to, Microsoft Outlook®, Bloomberg Professional® service terminal, or Thomson Reuters Eikon Messenger®.

Reviewers can securely access the provider's system 150 by logging into the system using a unique username and password. The reviewer loads a conversation-specific XML file into the system, and the file contents are displayed in a graphical user interface, such as the display screen shown in FIG. 8. The contents 202 of the communications are displayed in a reading pane 210 along with the screen names 206 and full names 204 of the participants that posted each message and the dates and time the message was posted. The display screen also includes a header pane 220 that provides general information concerning the communication session, including the unique session identification number 222, the dates and times the session was initiated and terminated, the total duration of the session, and the number of participants 224.

Reviewers can streamline the review process by filtering certain noise elements from the reading pane 210, including event entries showing when participants entered or left a session, history view entries (e.g., event entries showing when a participant-entered a session only to view or request the message history), or confidentiality disclaimers. Reviewers can filter out these elements by toggling the sliding inputs 232 under the Filter Results pane 230 to the OFF position and selecting the Apply function 234. The filters can be restored to the default ON or OFF setting by selecting the Reset function 236.

The system filters noise by searching the conversation-specific file for corresponding message content or metadata categories. Filtering can be better understood with reference to the following simplified examples. If a reviewer toggles the Show Entries and Exits sliding input 232 to the OFF position, then the system can search the conversation-specific file, such as the file shown in FIG. 3, to locate all ParticipantEntered and ParticipantLeft metadata tags. The system then removes corresponding event entries from the reading pane 210 without modifying the conversation-specific file and without the need to store prefiltered versions of the conversation-specific file. Similarly, if a reviewer toggles the Show All Disclaimers sliding input 232 to the OFF position, the system searches the message content of the conversation-specific file to locate all instance of a confidentiality disclaimer. The system then removes the corresponding entries from the reading pane 210.

In one embodiment, the systems and methods use a project-specific noise file that can be populated with known confidentiality disclaimers or other data. For instance, the systems may treat an entire message posting as noise if the message posting begins with the text "***DISCL" or "Confidentiality Statement." The system uses data from the project-specific noise file to search, identify, and filter noise from the conversation-specific file so that the noise can be removed from the reading pain 210. The project-specific noise file can be updated at any time during a discovery review project lifecycle. This has the advantage of creating a "progressive learning system" where noise does not need to be known up front at the time the initial archived communication data is gathered and initially processed.

Participants to a communication session are identified in list entries displayed under the Participants pane 240, and the business entities associated with the participants are separately identified in list entries under the Companies pane 250. The list entries can optionally display other useful information, such as participant screen names ("Login") and the number of messages posted by each participant or business entity ("Post Count"). The participants are correlated with their corresponding business entities by displaying the business entity name next to the participant names in the reading pane 210, as shown in FIG. 7, or by color coding each participant/business entity pair.

The participant/business entity pairs are color coded by providing an indicator 242 next to each Participant list entry that is the same color as an indicator 252 next to the corresponding Companies list entry. The display can further include a color-coded indicator 208 next to each posting by a participant in the reading pane 210. So, for instance, if the participant Ron Smith is associated with Practice Litigation Support business entity, then the indicators 242 & 252 next to the corresponding list entries can be rendered as orange colored. An orange-colored indicator 208 can also be displayed in the reading pane 210 next to each message posted by Ron Smith.

Reviewers can optionally display only those messages in a chat-transcript record posted by particular participants or business entities. To enable the participant filter, reviewers select the Participants filter function 244 shown in FIG. 8 to display the All Participants window shown in FIG. 9. The All Participants window displays separate list entries for each participant along with the participant's full name, screen name ("Login"), associated business entity ("Company"), and the number of messages posted by that participant ("Post Count"). On the All Participants window, a reviewer selects or deselects the checkbox 310 corresponding to a participant to remove or display the participant's postings in the reading pane 210. Upon selection or deselection of the checkbox 310, the system searches the conversation-specific file for all instances of metadata tags containing identifying information corresponding to that participant (e.g., the Login, FirstName, LastName, UUID, and FirmNumber tags). When the desired participants are selected or deselected, the reviewer selects the Apply function 312 to close the All Participants window and apply the filter.

Figure 8A:
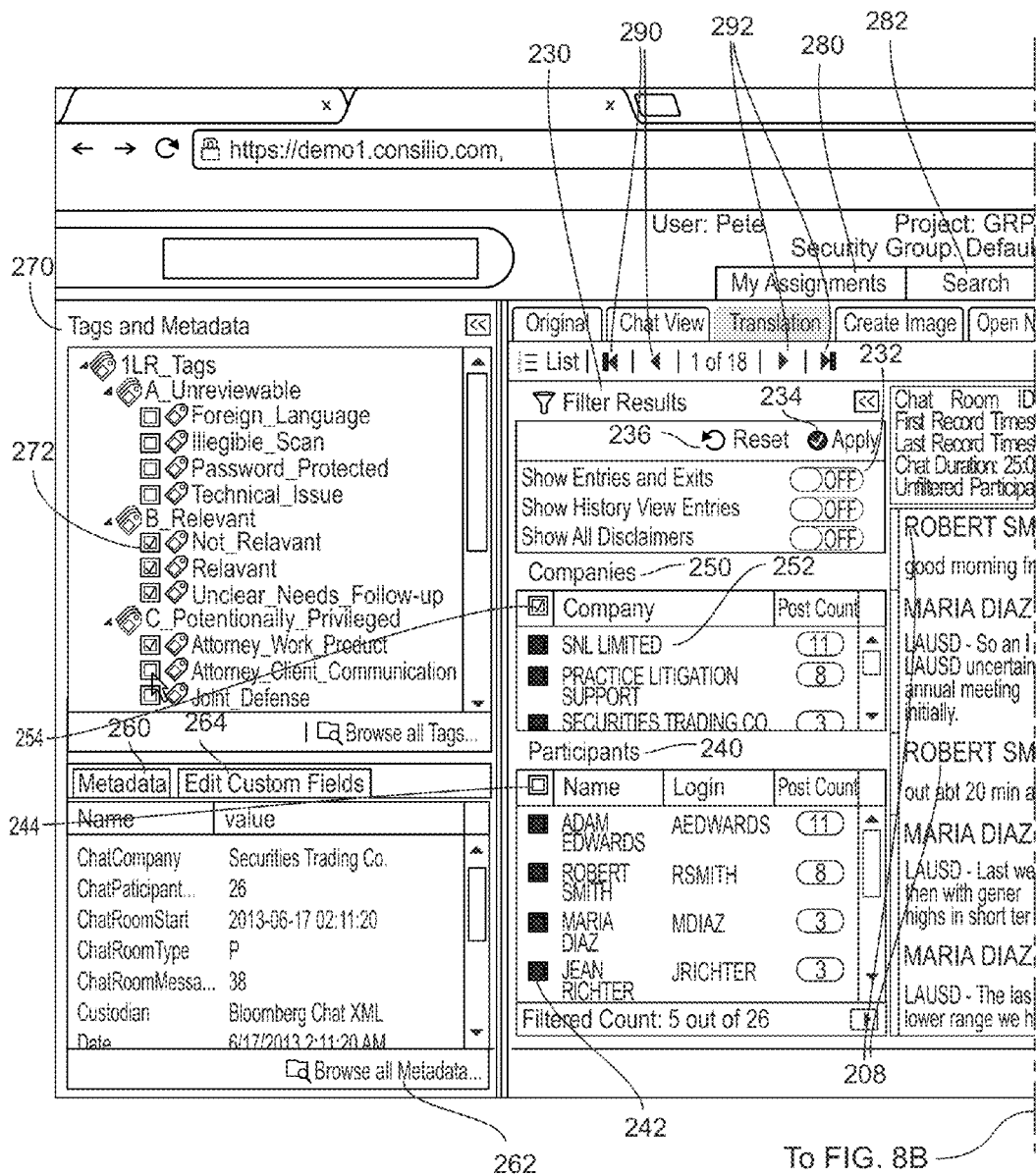
FIGS. 8A-8B illustrates an exemplary display screen for reviewing communication data.
Figure 8B:
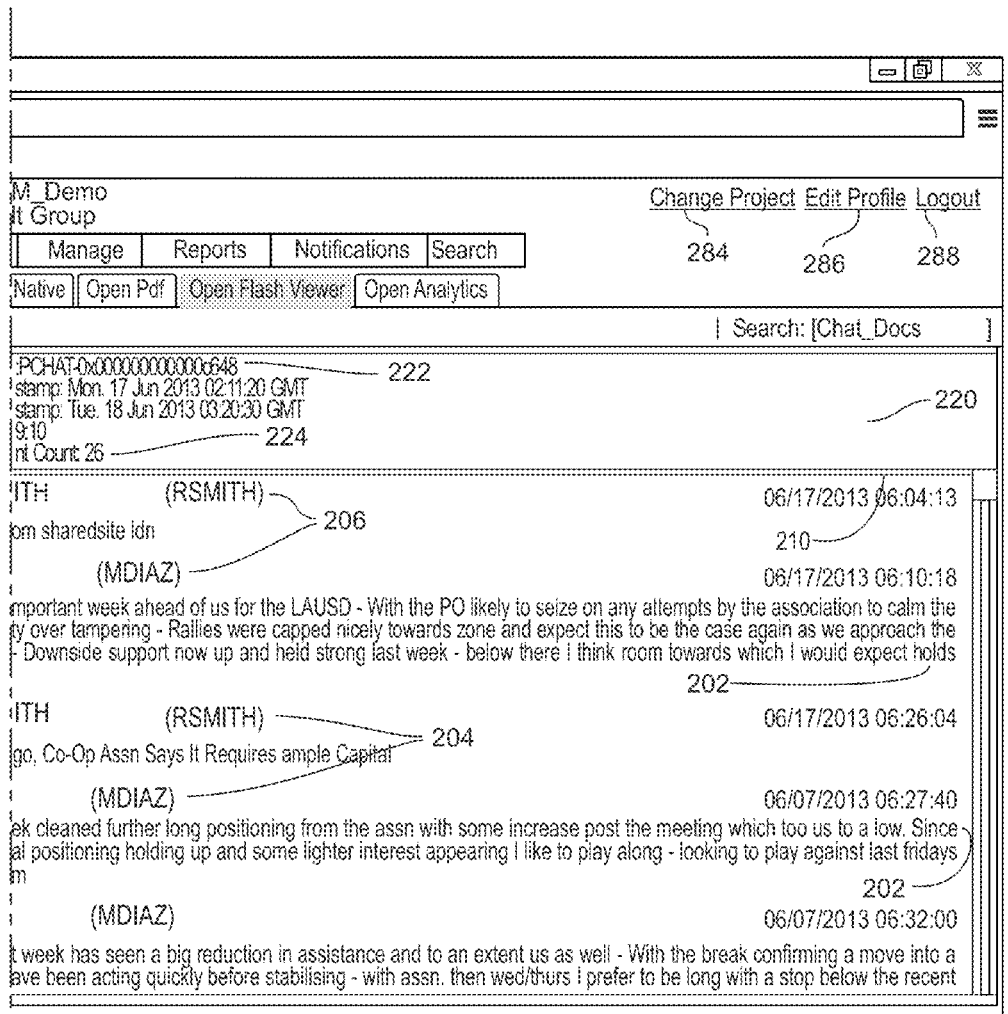
Figure 9A:
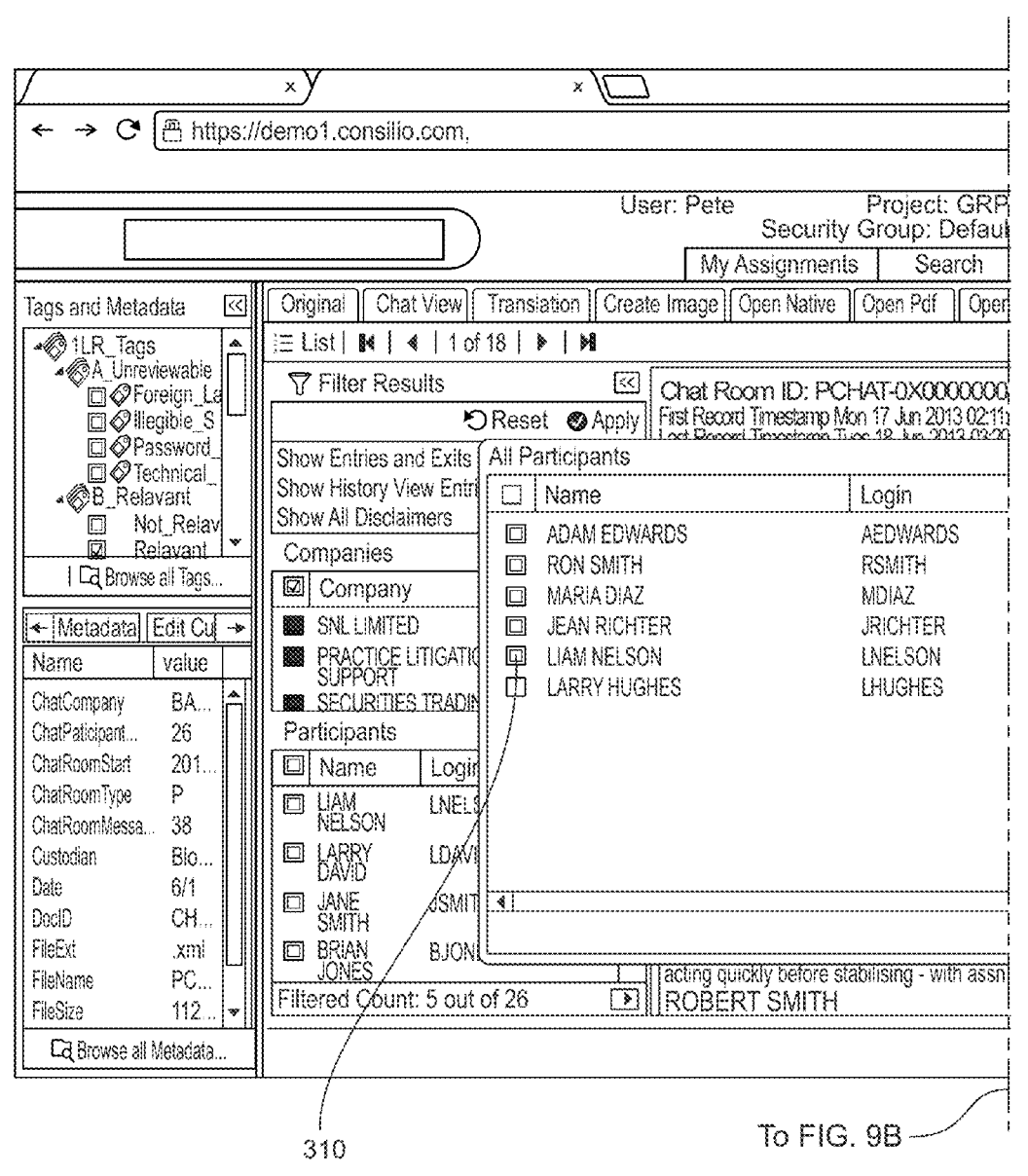
Figure 10B:
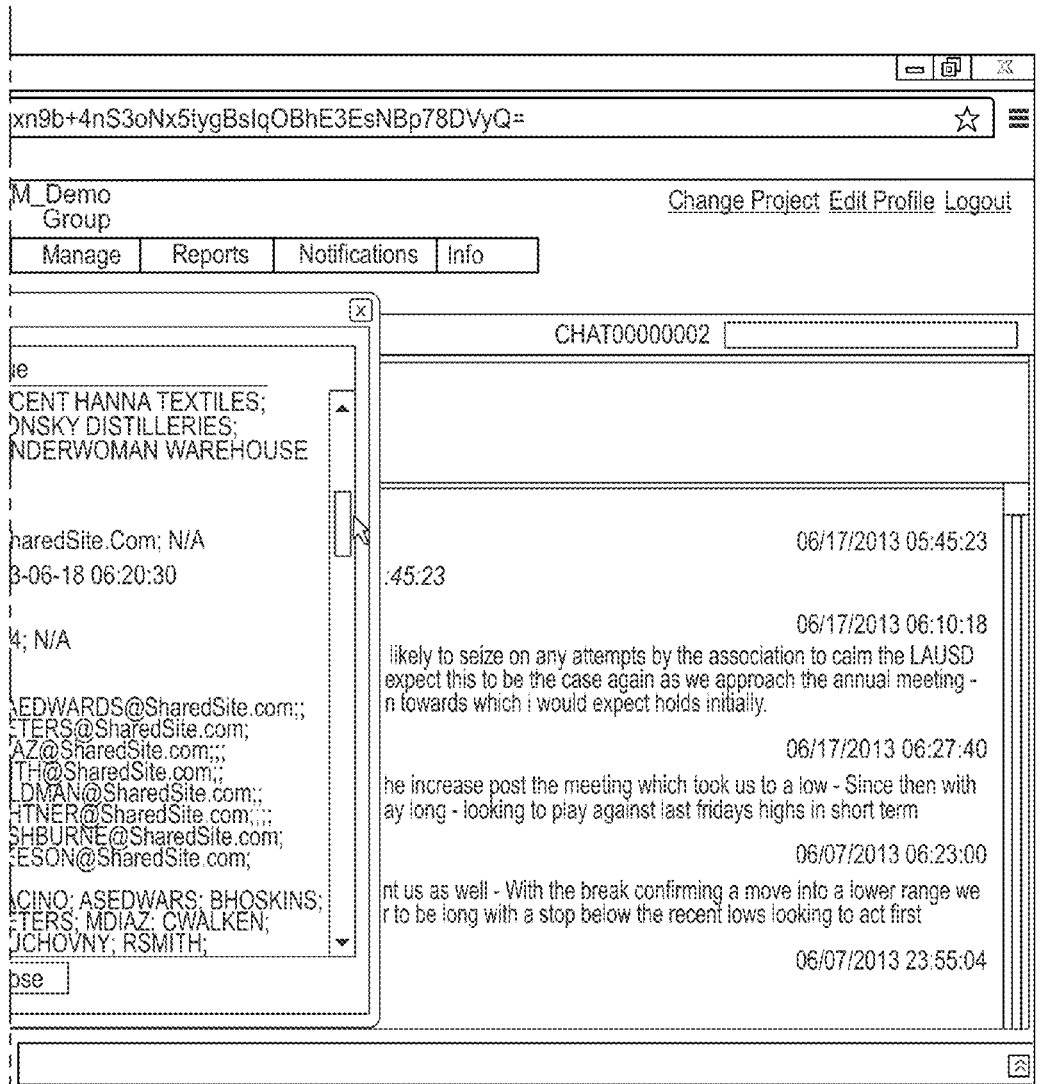
Figure 11A:
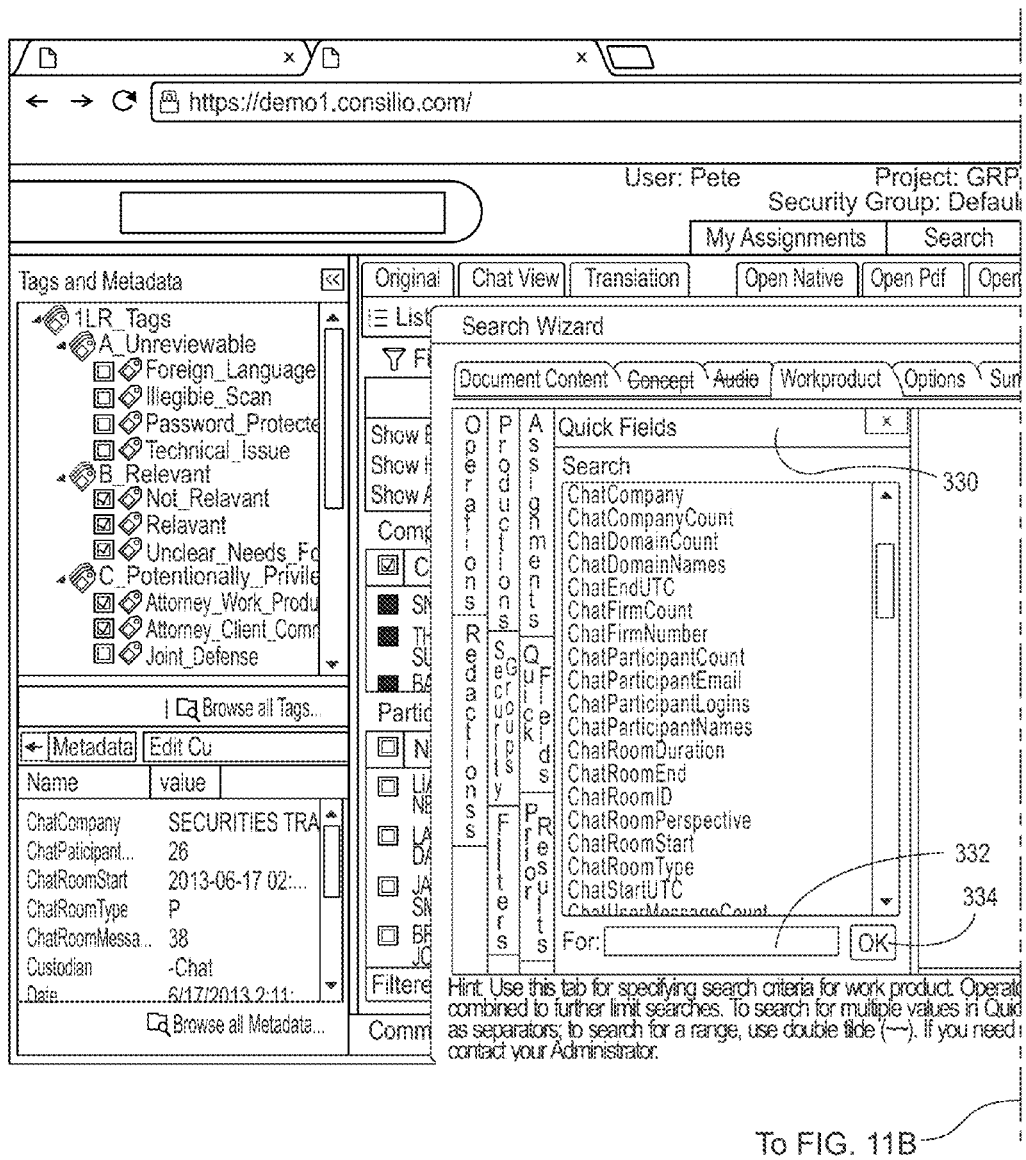
FIG. 11A-11B illustrates an exemplary display screen for searching communication data according to metadata categories.
Figure 11B:
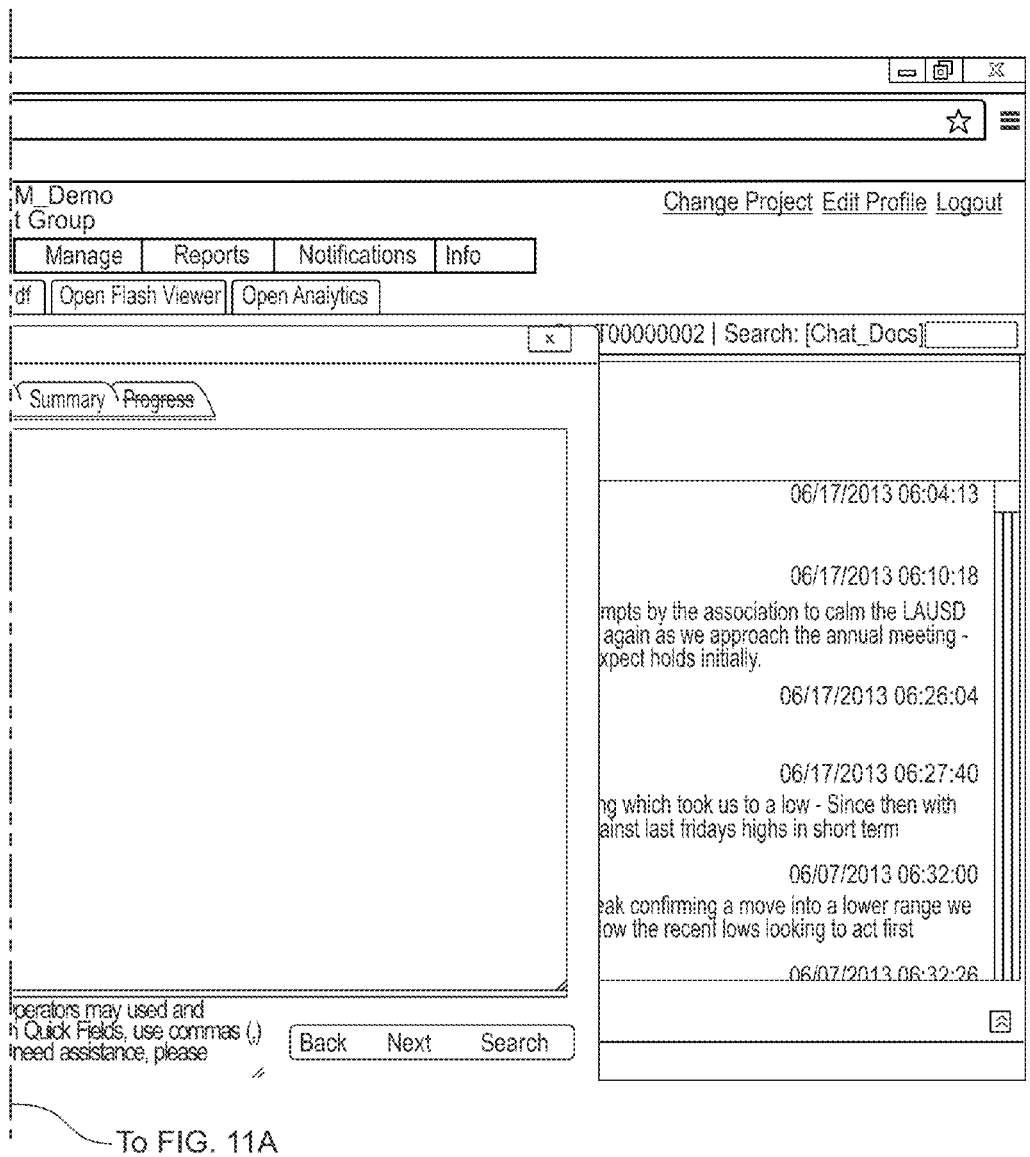
Figure 12A:
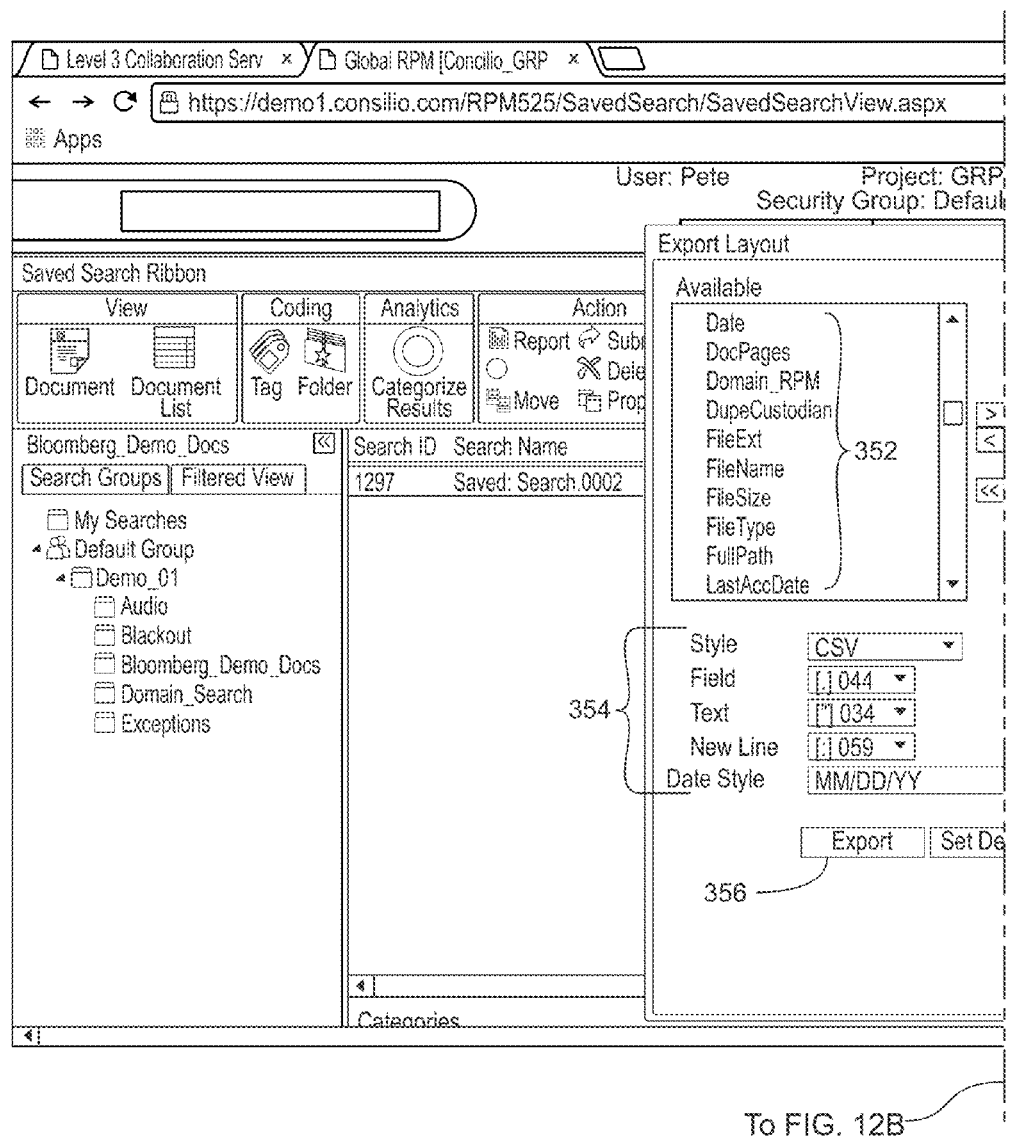
FIG. 12A-12B illustrates an exemplary display screen for exporting communication metadata.
Figure 12B:
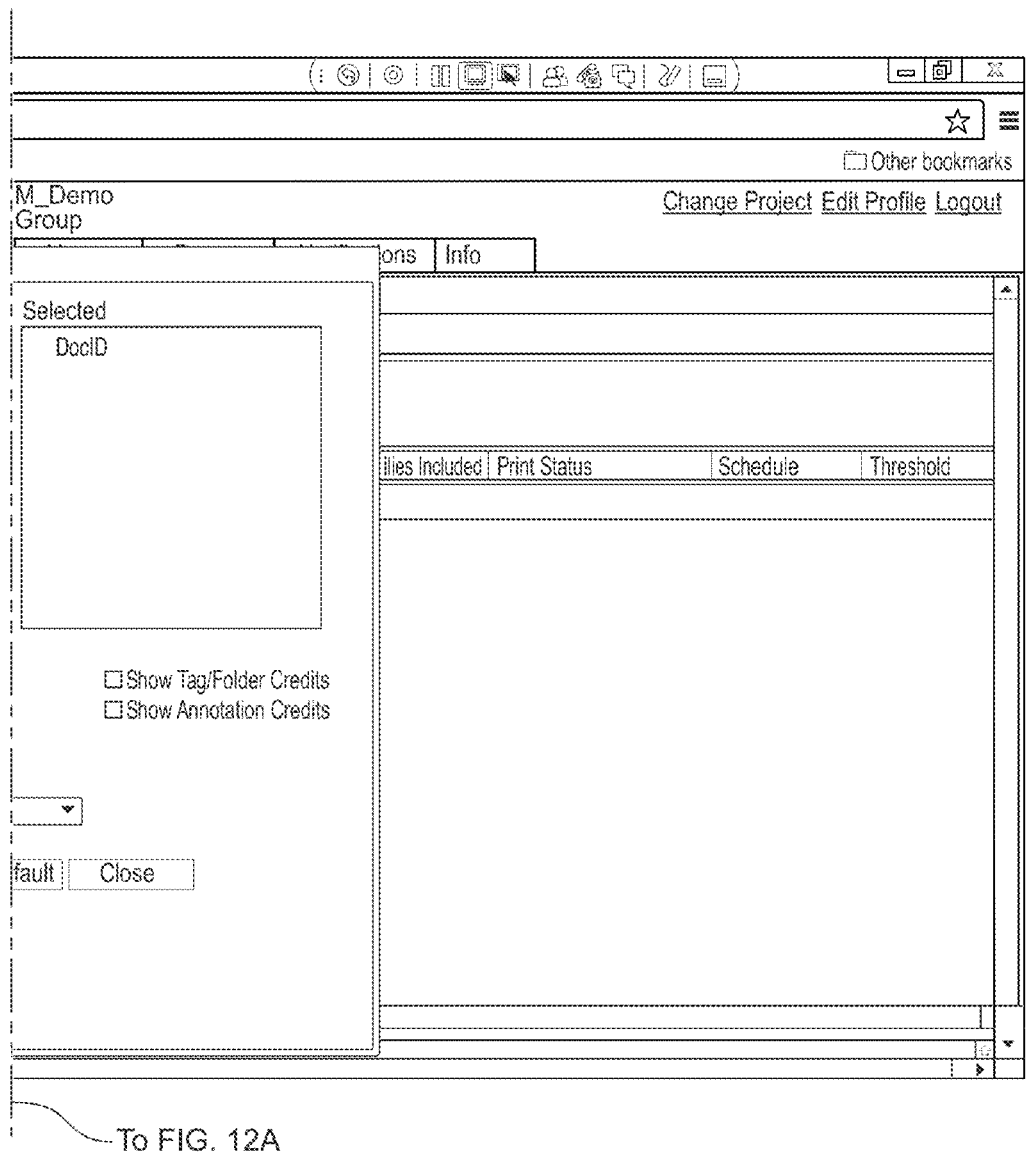

A summary of the metadata associated with a chat-transcript record is displayed under the Metadata tab 260 of the display screen shown in FIG. 8. Reviewers can access the complete metadata by selecting the Browse all Metadata function 262 to display the Document Metadata window shown in FIG. 9. Reviewers can also select the metadata categories that are displayed or hidden using functions available on the Edit Custom Fields tab 264.

Displaying general session information in the header pane 220, color coding the participant/business entity pairs, noise filtering, providing access to metadata categories, and displaying message count information assists reviewers in quickly evaluating the potential relevance of a conversation-specific file as well as potential workflow issues. By way of example, electronic discovery may involve multiple reviewers that bill on an hourly cost basis. To establish an efficient workflow, particular reviewers can be assigned to review certain conversation-specific files based on hourly rates, reviewer speed, or reviewer expertise, among other criteria. Reviewers can access assigned documents for review by selecting the My Assignments 280 tab shown in FIG. 8.

Chat-transcript records can be quickly categorized according to volume of data by referencing the chat duration and participant count 224 metadata fields. Chat-transcript records with a longer duration or more participants can be assigned to faster reviewers or reviewers with a lower hourly rate. As another example, if it is known that a reviewer is especially familiar with communication data originating from a particular participant or business entity, then the conversation-specific files containing the largest number of message posts originating from that participant or entity can be assigned to the reviewer with the most relevant expertise. A reviewer can utilize the filtering functions under the Filter Results pane 230, Companies pane 250, and Participants pane 240 to streamline the data display and analyze only those messages from certain participants and business entities.

The methods and systems can incorporate additional features that facilitate efficient workflow administration during document review, including searching for conversation-specific files based on metadata information. Reviewers select the Search function 282 to open the Search Wizard window displayed in FIG. 11. Reviewers enter search criteria by selecting the desired metadata categories under the Quick Fields tab 330, entering data values to be searched in the "For:" text box 332, and selecting the OK function 334.

To illustrate, a reviewer can initiate a search for all conversation-specific files that include twenty to thirty participants. A reviewer selects the ChatParticipantCount metadata category under the Quick Fields tab 330 and enters a range of "20~~30" in the For: text box 332. Or a reviewer can search for all conversation-specific files including messages posted by the participant Ron Smith by selecting the ChatParticipantNames metadata field and entering "Smith" in the For: text box 332. In another aspect of the invention, reviewers can export the metadata information to a separate file (e.g., a spreadsheet) by selecting the desired metadata categories 352 from the Export Layout window illustrated in FIG. 12, selecting the desired display settings 354 (e.g., style, field, text, line break characters, date style, etc.), and selecting the Export function 356. Reviewer assignments can then be determined with reference to the exported metadata.

During the review, documents can be classified according to relevance, confidentiality, privilege, and the like by selecting the appropriate checkbox "tags" 272 under the Tags and Metadata pane 270. The exemplary classifications shown in the attached figures include tags 272 relating to document relevance (e.g., Not_Relevant; Relevant; Unclear_Needs_Follow-up), attorney-client privilege (e.g., Attorney_Work_Product; Attorney-Client_Communication; Joint Defense), and tags 272 relating to the reviewability of a document (e.g., Foreign Language; Illegible Scan; Password_Protected; and Technical_Issue). Reviewers can switch between documents by selecting the forward 292 and back 290 functions.

The system optionally provides certain identity management ("IdM") and security features. Reviewers can input, store, and edit profile information, such as reviewer identity information, passwords, or display preferences by selecting the Edit Profile function 286. Reviewers can switch between projects (i.e., sets of documents to be reviewed) by selecting the Change Project function 284. And when a document review session is complete, a reviewer selects the Logout function 288 to terminate the session and prevent unauthorized access to the system.

After all electronic documents in a project have been reviewed and appropriately classified, the documents can be formatted for production to other parties in a legal proceeding or investigation. The electronic documents can be produced in any suitable format known to one of ordinary skill in the art, including XML, PST, EML, portable document format ("PDF"), or an image format (e.g., Tagged Image File Format ("TIFF")).

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer-implemented method of electronic document review comprising the steps of:
    (a) providing a discovery computing device;
    (b) parsing by the discovery computing device, a source file into at least one conversation-specific file, the at least one conversation-specific file comprising message content and a first metadata category;
    (c) transmitting from the discovery computing device to a reviewer computing device, the message content and the first metadata category for the at least one conversation-specific file;
    (d) searching by the discovery computing device, the at least one conversation-specific file for message content according to the first metadata category;
    (e) filtering by the discovery computing device, the message content by selecting or deselecting the message content for display by the reviewer computing device according to the first metadata category; and
    (f) transmitting the filtered message content from the discovery computing device to the reviewer computing device.

2. The method of claim 1 wherein the first metadata category is a participant identifier.

3. The method of claim 1 wherein the first metadata category is a participant-entity identifier.

4. The method of claim 1 wherein:
    (a) the at least one conversation-specific file further comprises a second metadata category;
    (b) the first metadata category is a participant-entered event, and the second metadata category is a participant-left event; and
    (c) the message content is filtered by the discovery computing device according to the participant-entered and the participant-left events by selecting or deselecting message content for display by the reviewer computing device.

5. The method of claim 1 wherein the at least one conversation-specific file message content comprises disclaimer text, and the method further comprises the steps of:
    (a) filtering by the discovery computing device, the disclaimer text from the message content by selecting or deselecting the disclaimer text for display by the reviewer computing device; and
    (b) transmitting the filtered message content from the discovery computing device to the reviewer computing device.

6. The method of claim 1 further comprising the steps of:
    (a) searching by the discovery computing device, the at least one conversation-specific files according to the first metadata category and a first metadata category value; and
    (b) transmitting the conversation-specific files that include the first metadata category and the first metadata category value from the discovery computing device to the reviewer computing device.

7. The method of claim 6, wherein the first metadata category is selected from the group consisting of a session duration, a participant count, a participant identifier, and an entity identifier.

8. A computer-implemented method of electronic document review comprising the steps of:
    (a) providing a reviewer computing device associated with a reviewer;
    (b) providing a discovery computing device;
    (c) receiving by the reviewer computing device, a conversation-specific file transmitted by the discovery computing device, the conversation-specific file comprising message content and a first metadata category;
    (d) transmitting by the reviewer computing device, a filter request to the discovery computing device requesting that the message content for the conversation-specific file be filtered by selecting or deselecting the message content for display by the reviewer computing device according to the first metadata category;
    (e) searching by the discovery computing device, the conversation-specific file for message content according to the first metadata category;
    (f) filtering by the discovery computing device, the message content by selecting or deselecting the message content for display by the reviewer computing device according to the first metadata category; and
    (g) receiving by the reviewer computing device, the filtered message content transmitted by the discovery computing device.

9. A system for electronic document review comprising:
    a first processor associated with a reviewer;
    a second processor associated with a discovery device; and
    a data storage device including a non-transitory computer-readable medium having computer readable code for instructing the processors, and when executed by the processors, the processors perform operations comprising:

(a) parsing by the second processor, a source file into at least one conversation-specific file, the conversation-specific file comprising message content and a first metadata category;
(b) transmitting from the second processor to the first processor the message content and the first metadata category for the at least one conversation-specific file;
(c) searching by the second processor, the at least one conversation-specific file for message content according to the first metadata category;
(d) filtering by the second processor, the message content by selecting or deselecting the message content for display by the first processor according to the first metadata category; and
(e) transmitting the filtered message content from the second processor to the first processor.

10. The system of claim 9 wherein the first metadata category is a participant identifier.

11. The system of claim 9 wherein the first metadata category is a participant-entity identifier.

12. The system of claim 9 wherein:
(a) the at least one conversation-specific file further comprises a second metadata category;
(b) the first metadata category is a participant-entered event, and the second metadata category is a participant-left event; and
(c) the message content is filtered according to the participant-entered and the participant-left events by selecting or deselecting message content for display by the first processor.

13. The system of claim 9 wherein the at least one conversation-specific file message content comprises disclaimer text and the processors are further configured to perform operations comprising:
(a) filtering by the second processor, the disclaimer text from the message content by selecting or deselecting the disclaimer text for display by the first processor; and
(b) transmitting the filtered message content from the second processor to the first processor.

14. The system of claim 9 wherein the processors are further configured to perform operations comprising:
(a) searching by the second processor, the at least one conversation-specific file according to the first metadata category and a first metadata category value; and
(b) transmitting the conversation-specific file from the second processor to the first processor, if the conversation-specific file includes the first metadata category and the first metadata category value.

15. The system of claim 14, wherein the first metadata category is selected from the group consisting of a session duration, a participant count, a participant identifier, and an entity identifier.

16. A system for electronic document review comprising:
a processor associated with an electronic discovery system; and
a data storage device including a non-transitory computer-readable medium having computer readable code for instructing the processor, and when executed by the processor, the processor performs operations comprising:
(a) parsing a source file into at least one conversation-specific file, the at least one conversation-specific file comprising message content and a first metadata category;
(b) displaying the message content and the first metadata category for the at least one conversation-specific file;
(c) searching the at least one conversation-specific file for message content according to the first metadata category;
(d) filtering the message content by selecting or deselecting the message content for display according to the first metadata category; and
(e) displaying the filtered message content.

* * * * *